TELEVISION SIGNAL RECORDING WITH SAMPLED AUDIO RECORDED DURING HORIZONTAL INTERVALS

Filed Jan. 3, 1964 3 Sheets-Sheet 1

INVENTOR:
Hugh F. Frohbach
By Smyth, Roston & Pavitt
Attorneys

INVENTOR:
Hugh F. Frohbach
By Smyth, Roston & Pavitt
Attorneys

INVENTOR:
Hugh F. Frohbach
By Smyth, Roston & Pavitt
Attorneys

United States Patent Office 3,391,247 Patented July 2, 1968

3,391,247

TELEVISION SIGNAL RECORDING WITH SAMPLED AUDIO RECORDED DURING HORIZONTAL INTERVALS

Hugh F. Frohbach, Sunnyvale, Calif., assignor to Minnesota Mining and Manufacturing Company, St. Paul, Minn., a corporation of Delaware Filed Jan. 3, 1964, Ser. No. 335,552
11 Claims. (Cl. 178—5.8)

ABSTRACT OF THE DISCLOSURE

Video signals are recorded on a disk in a spiral track. The corresponding audio information is sampled during each pulse period, but recorded in groups in selected blanking pulse periods to avoid juxtapositioning of audio recordings in neighboring tracks.

The present invention relates to a system for recording information such as video and audio information on a storage medium, such as a disk or drum, and for reproducing such information from the storage medium. More particularly, the present invention relates to a system for recording audio information on the same track on which there are recorded, or are to be recorded, video signals.

It is the primary object of the present invention to record audio and video information in alternatingly succeeding track portions.

Systems have been devised in recent years for recording high-frequency information on a storage medium and for attaining a subsequent reproduction of the information from the storage medium. For example, information has been recorded on a magnetic tape where the information constitutes video and audio signals having characteristics which respectively represent at each instant an image being viewed and the sounds emanating from the environment of the image. Signals are also recorded on storage media in representation of different scientific and mathematical information, including the readings of instruments and the values obtained from computations performed by digital computers.

For the recording of high-frequency information, the systems now in use generally employ magnetic tapes as the storage medium. These tapes have, in general, proved fairly satisfactory in recording signals representative of information and in obtaining the reproduction of the information. However, the fidelity of the recording and reproduction is dependent upon the magnetic structure of the tape, so that the magnetic tapes have to be manufactured with considerable precision. However, the information recorded on the magnetic tapes has a limited density of information packing, so that a relatively great amount of tape is required to store the information represented, for example, by a television program having a duration of approximately a half hour. The limited density of information packing on the tape has resulted from limitations in the speed of response of the magnetic transducer heads which are disposed in contiguous relationship to the tape. It has also resulted from limitations in the frequency at which information can be transferred between the magnetic transducer heads and the magnetic layers on the tape.

The systems now in use generally dispose the transducer head adjacent to the tape to record information in magnetic form on the tape and to reproduce such magnetic information as electrical signals from the tape. The adjacent relationship between the transducer head and the tape causes the tape to rub occasionally against the head, so that magnetic particles become removed from the tape and are deposited on the head to affect the operation of the head. The magnetic particles removed from the tape also tend to produce an abrasive action on the head so that the response characteristics of the head become permanently affected.

Systems using disks as the master would probably be more desirable than tapes, since they tend to store information in a more compact form than tapes. However, the disk systems of the prior art have generally involved a groove cut in a disk of plastic material, with variations in the walls of the groove representing the electrical information.

The prior art disk systems have had certain important deficiencies. For example, the reproducing means has generally engaged the disk. For example, the reproducing means has constituted a needle which has contacted a groove in the disk to reproduce the information on the disk. This contact between the needle and the groove has tended to wear the disk after the disk has been used several times. It has also tended to wear the needle so as to reduce the subsequent fidelity of reproduction from the disk.

This invention now relates to a system using a storage medium such as a disk which is responsive to information to be recorded so as to vary the light-transmission characteristics of the disk in accordance with such information. For example, the light-transmission characteristics of the disk are varied in a spiral track during the recording operation by an electron beam whose characteristics are controlled by signals representative of the incoming information. By way of illustration, the intensity of the electron beam may be varied by adjusting the potential on the grid of an electron gun in accordance with the characteristics of the information to be recorded. Since the electron beam is projected toward the disk from a position removed from the disk, no frictional forces are produced on the disk by the transducer action.

The signals can be reproduced from the disk by directing at the disk a light bam and by modifying the light beam in accordance with the light-transmission characteristics previously provided at successive positions on the spiral track in the disk. The modified light beam is detected to obtain a recovery of the information previously recorded on the disk. By directing a light beam at the disk, the information on the disk can be reproduced without having any members directly engage the disk. In this way, no wear is produced on the disk during the reproduction of the information on the disk.

In addition to the features outlined above, the recording or reproducing system also should include means for controlling the tracking of the recording or the reproducing means across the disk. A coarse control is provided for either inscribing or following the spiral track on the disk. A fine control is provided to center the read-in or the read-out beam means relative to the track upon rotation of the disk.

In addition to the features in the recording system as described above, the disk itself used in conjunction with the system is also of specific interest. For example, the disk is provided with a backing made from a suitable material to have characteristics of transmitting light. A thin coating of photographic emulsion is placed on the backing. The photographic emulsion is sensitive to electrical energy so as to become exposed when subjected to an electron beam. The degree of exposure at each instant depends on the intensity of the electron beam at that instant. Because of this, the disk contains at progressive positions on the spiral track light-transmission characteristics which represent the variable intensity of the electron beam.

The information is retrieved from the disk by directing and focusing a light beam through the disk. Since the disk has variable characteristics of transmitting light at successive positions on the disk, the intensity of the light beam passing through the disk at each instant is modulated in accordance with the light-transmission characteristics of the disk.

It will be appreciated that the disk may be provided with variable characteristics of reflecting light rather than of transmitting light. Under such circumstances, the reproducing means is operative upon the light reflected from the disk rather than the light transmitted through the disk. It will also be appreciated that other information storage means such as a cylinder, a drum, or an endless belt may be used instead of the disk, without departing from principles presently involved.

One of the problems encountered in the preparation of recording disks of the character described is to be seen in that the same disk should contain video as well as audio information, whereby, of course, strict synchronism is to be observed. One obvious method could be to provide parallel audio and video tracks respectively inscribed by two such beams, one being audio-modulated, the other being video-modulated and inscribing interleafed spirals. This method, however, is not feasible because an undue amount of recording space would be required for the audio information. Similar recording space for audio and video signals is essentially not needed.

It is thus an object of the present invention to provide a recording system operating so as to use for audio recording the track portions in the video recording track allotted for the recording of synchronization and blanking pulses, for example, the horizontal blanking pulses.

It is a further object of the present invention to record audio information during the video blanking period without incurring cross talk during play back, even if the reproduction of the video recording is carried out by scanning two or even more parallel video tracks simultaneously.

With reference to this latter object, it should be borne in mind that the video information, as it is recorded line by line and frame by frame in the spiral track, is synchronized to rotation of the disk in such a manner that a spiral-track portion corresponding to one complete disk revolution contains one frame. Accordingly, in such a track portion of precisely 360° angular length, there are recorded 525 horizontal sync and blanking signals. Track segments of neighboring tracks pertain to the same scanning spot on the video screen of two succeeding frames and thus have recorded very similar information, because there is little change from frame to frame. Of course, all of the sync and blanking pulses pertaining to the same screen line of all the frames recorded are recorded in radially aligned relationship. Hence, any recording made of a blanking pulse is juxtaposed to the recordings of two blanking pulses respectively pertaining to the preceding and the subsequent frame. Utilization of the blanking-pulse recording space for additional recording of audio signals is liable to incur cross talk. In case multiple-track scanning is desired, such cross talk of the audio information recorded in such aligned sync-pulse track portions has to be suppressed or avoided.

According to one aspect of the present invention in a preferred embodiment thereof, it is suggested to record audio information by means of the following system. First, use is being made of the horizontal blanking- and sync-pulse generator. From this generator there is derived a train of control pulses with the pulse frequency being equal to the line frequency, but each control pulse is of shorter duration than the blanking or sync pulses. The audio source, for example, a microphone, is effectively coupled to a terminal means for transmitting thereto audio signals only during occurrence and for the duration of the control pulses, thereby forming signals which shall be designated throughout this specification as audio signal pulses. Since a blanking period is about 10 microseconds long, this period is very short as compared with the oscillation period of a 15-kilocycle audio signal, which is about 60 microseconds; and since the audio signal pulses are produced at the rate of the horizontal sync and blanking pulses, they are, in effect, constituted by D.C. voltage blocks, with the audio signals proper appearing as amplitude modulation of the roof of each block. A network is connected to these terminal means for sampling a plurality of the spaced audio signal pulses and for forming a composite pulse thereof, in which composite pulse the several sampled audio signal pulses follow each other in direct sequence. This composite pulse is being recorded during one blanking period. Accordingly, not every blanking period contains audio signals; if $n$ pulses are being so sampled and combined to form a composite pulse, then the audio will be recorded only during every $n$th blanking period. In order to insure attainment of the above object, the ratio $525/n$ must not be an integer. Since 525 is the product of $3\times5\times5\times7$, $n$ must not be either one of these digits or a product of any two or three of these digits. If this rule is fulfilled, any blanking period having an audio recording will be juxtaposed to two other blanking periods of neighboring tracks having no such recording.

Further features of the invention include analogous circuit means for reproducing such a recording. Hence, any recording made of a blanking pulse will be juxtaposed to the recordings of two blanking pulses, respectively, pertaining to the preceding and the subsequent frame. Utilization of all the blanking-pulse recording spaces for additionally recording audio signals is liable to incur cross talk. In particular, it is a feature of the present invention to provide a network adapted for the formation of a composite pulse of the character described, and to decompose such a pulse at play back.

Systems inscribing recordings along a spiral track on a disk and for reproducing such recorded information are, for example, described in copending patent applications of Johnson, Ser. No. 181,392, filed Mar. 21, 1962, and now abandoned, and Johnson et al., Ser. No. 192,930, filed May 7, 1962, now U.S. Patent No. 3,361,873.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

Figure 2:
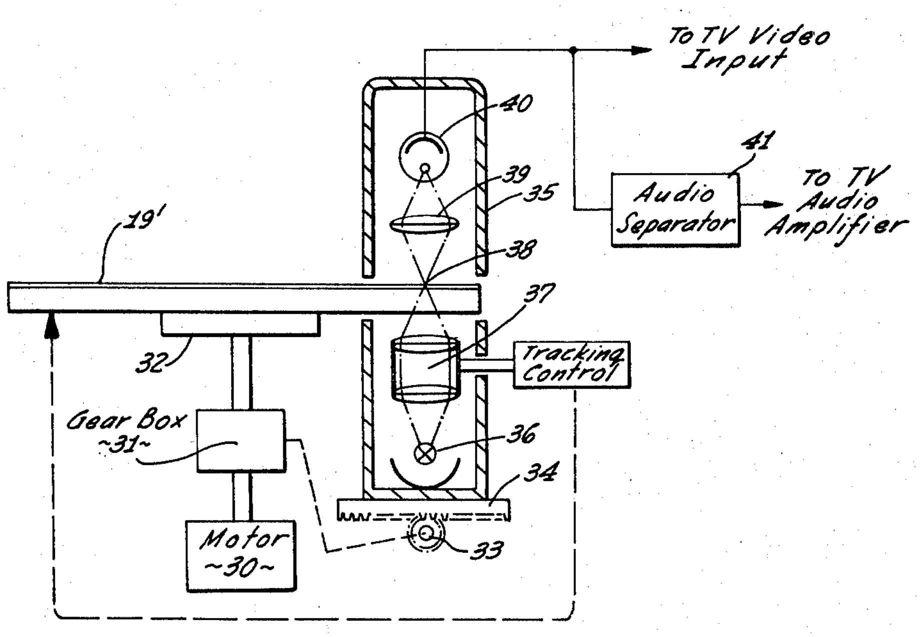
FIG. 2 illustrates somewhat schematically a reproducing system for a recording produced with a system shown in FIG. 1.
Figure 3:
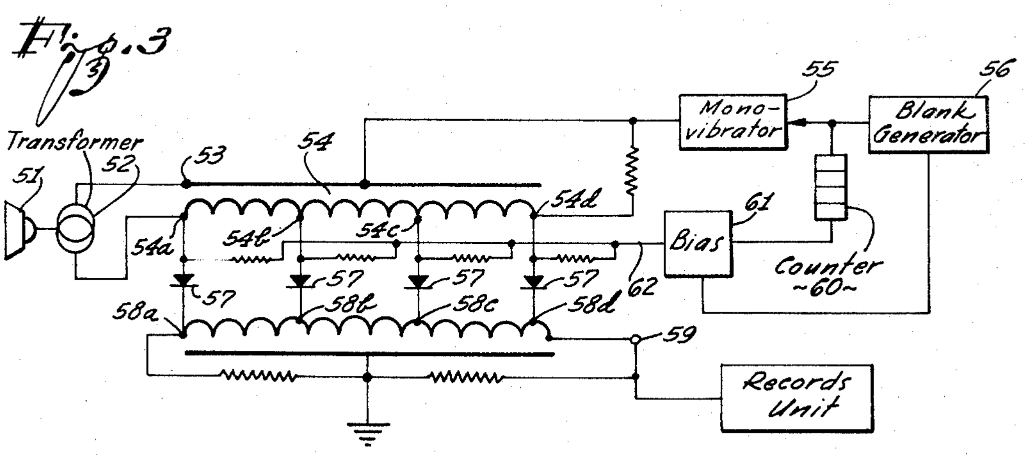
FIG. 3 illustrates a circuit network diagram for the formation of audio signal pulses and a composite pulse for recording same.
Figure 5:
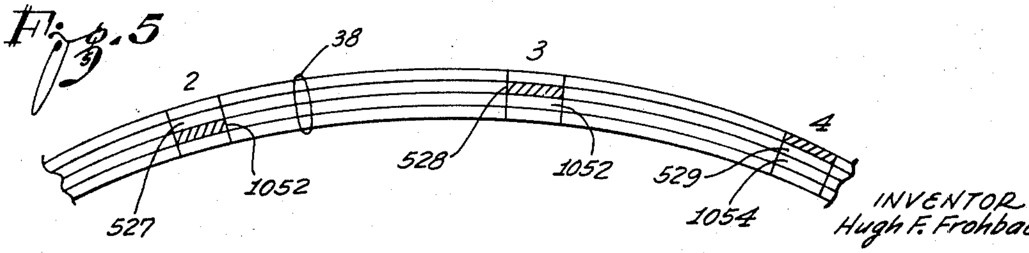
Figure 6:
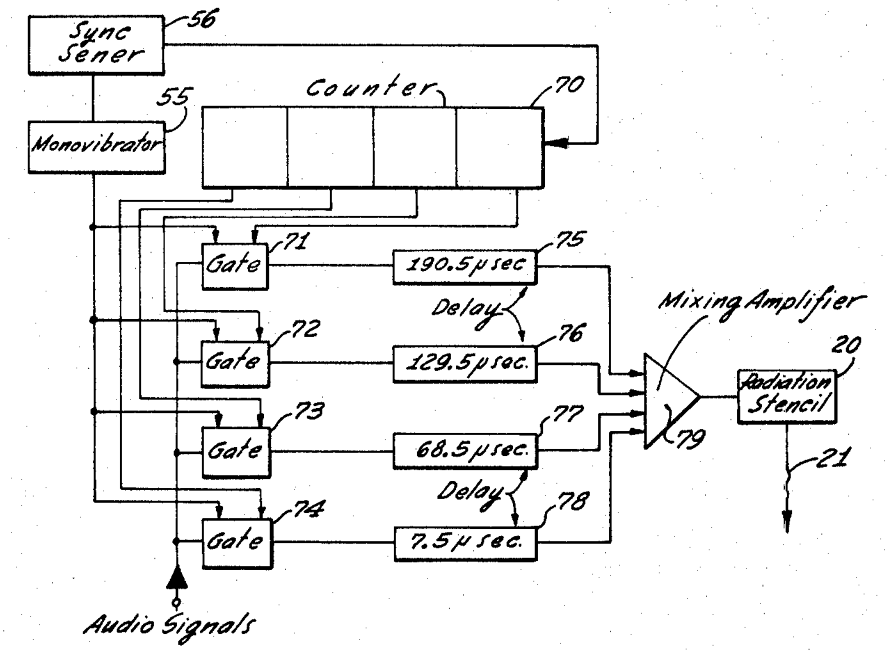
Figure 7:
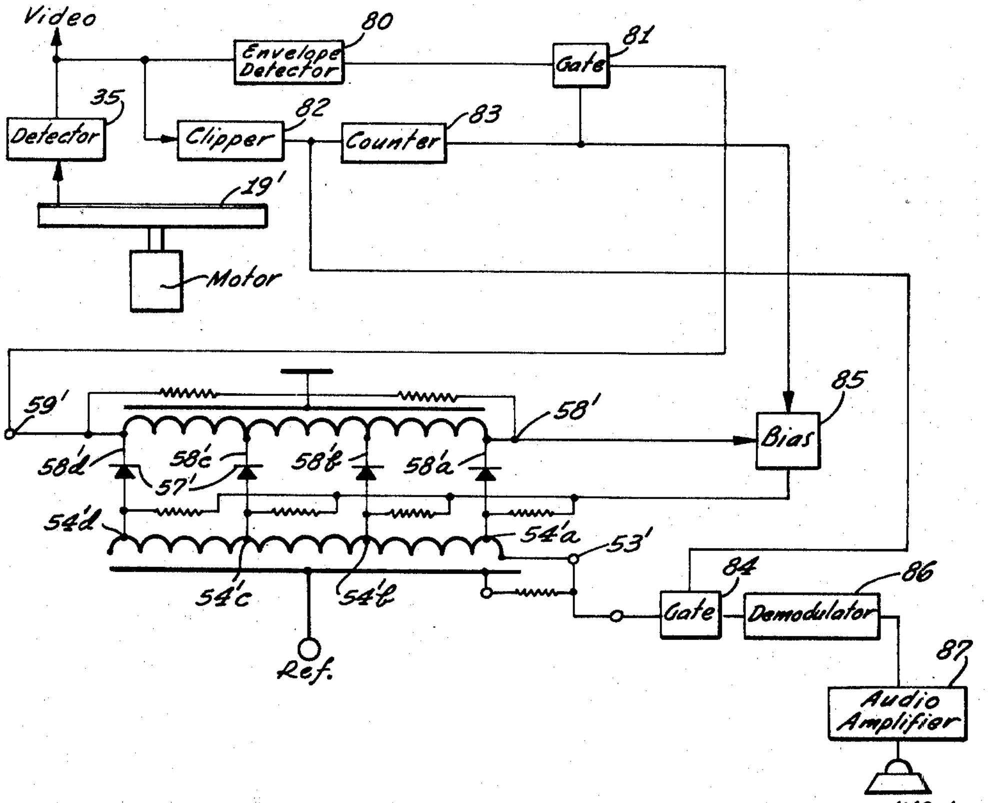

FIGS. 4*a*, 4*b*, 4*c*, and 4*d* are pulse diagrams plotted against time for various pulses as they appear in the network shown in FIG. 3;

FIG. 5 illustrates somewhat schematically the top view of a recording disk, with four parallel track portions of a single spiral track;

FIG. 6 illustrates a block diagram of a modified audio signal-pulse forming unit, and FIG. 7 illustrates a circuit diagram, partially as a block diagram of an audio-separator network as shown in FIG. 2.

Figure 1:
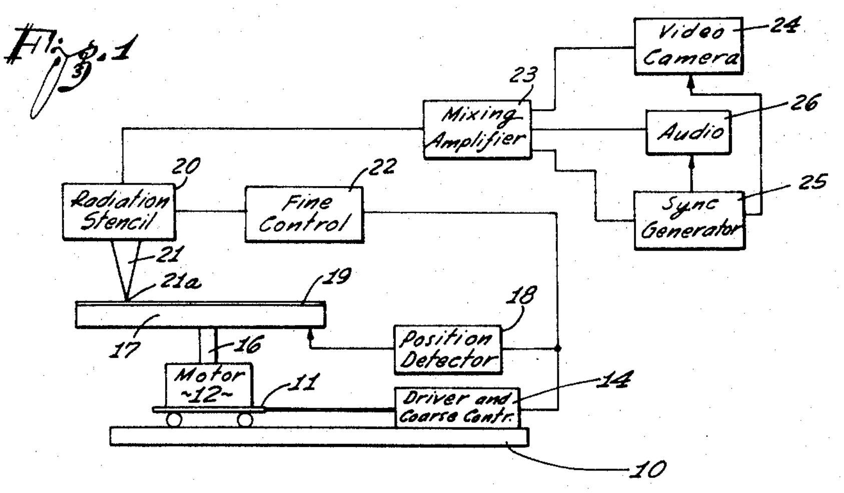
FIG. 1 illustrates somewhat schematically a block diagram of a recording system, of which the present invention constitutes an improvement.

Proceeding now to the detailed description of the drawings, FIG. 1 shows a block diagram of a video-audio recording system incorporating the features constituting the present invention. On a base 10 constituting, for example, a sliding bed, there is provided a carriage 11 supporting a motor 12 to be moved in the direction of double arrow 13. The carriage 11 is being driven by a driver 14 mounted on base plate 10 and linked to carriage 11 through a driving linkage 15, thus establishing the driving connection.

Motor 12 itself has an upwardly directed shaft 16 driving a horizontally extending turntable 17.

There may be provided a position detector 18, scanning appropriate identification markers on turntable 17 or markers rotating in synchronism with turntable 17. Position detector 18 feeds control signals to the driver 14, for example, for purposes of establishing a coarse control of this driver with regard to the transmission of movement to carriage 11.

During the recording operation, motor 12 rotates turntable 17, and driver 14 moves carriage 11 linearly along a straight line.

A recording disk 19 is placed on turntable 17, preferably of the type carrying a photographic layer at its top. The backing member of recording disk 19 may be transparent, so that any exposure of the photographic layer to a recording beam of radiation alters the rate of transmission for light in an area exposed to such a radiation beam.

In order to inscribe a recording track on disk 19, and particularly the photographic layer thereon, there is provided a stationary source of radiation 20 directing a beam 21 in a vertical direction towards the photographic layer of recording disk 19. Beam 21 is being focused onto this photographic layer, so as to define a spot **21*a* thereon. The source of radiation 20** could also be designated a radiation stencil, and it includes the source of radiation proper, the focusing means, and means for controlling the intensity of the beam.

In the preferred form of practicing the invention, this source of radiation 20 will comprise an electron gun, including the necessary control and focusing electrodes. Focusing may be had electrostatically and/or electromagnetically. In this case, the beam 21 is constituted by a stream of focused electrons, with the focusing being adjusted to the plane of extension of the photographic layer on recording disk 19. Of course, in this situation the entire arrangement has to be mounted inside of a vacuum in order to avoid scattering of the electrons constituting beam 21.

Radiation source or stencil 20 may also comprise the light source appropriately focused by lenses. Since the recording track to be produced is preferably of very small width, i.e., in the range of one micron, one might employ with advantage a Laser as a radiation source.

There may be provided a fine control network 22 altering the direction of focusing of beam 21 in response to an error signal developed by position detector 18.

It will be appreciated that the spot **21*a* of radiation beam 21 on recording disk 19 will inscribe a spiral track in the photographic layer, since motor 12 and driver 14 impose a composite rotary and linear movement upon turntable 17**.

Radiation stencil 20 receives a composite signal to be recorded from a mixing amplifier network 23, which might include an RF carrier source with modulator. This network 23 receives a video signal from a video camera 24; it further receives, from scanning and synchronization unit or generator 25, synchronization and blanking pulses and signals for recording same. It is, of course, possible to have the synchronization generator only operating the video camera, so that the video camera output signal already includes recordable synchronization and other control pulses. Finally, there is provided a source of audio signals 26 for example, a microphone, directed towards the object observed by the video camera. The audio source 26 may also include, for example, a source of background music or any other sound to be recorded as sound in connection with the recorded video signal.

The present invention relates to a system of controlling the transmission of the audio signals to the radiation stencil 20 in synchronism with selected control pulses derived from generator 25, so that audio and video signals are being recorded on a common track on recording disk 19. Particularly the audio signals are to be recorded in track portions serving as a recording for control signals such as the horizontal blanking pulse or the horizontal sync pulse.

In FIG. 2, there is shown schematically a video-phonograph usable as an attachment to a conventional TV set. This record player includes a motor 30 feeding a rotary output to a gearbox 31, from which a turntable 32 is being driven in a manner known for conventional phonographs. However, it should be noted that precision drives are necessary for use in the present record player, since a highly accurate, constant speed and very accurate tracking are required for adequate reproduction of such a composite video-audio recording.

A recording disk 19′ is seated on turntable 32, and it shall be assumed that recording disk 19′ was produced with the aid of the recording system explained with reference to FIG. 1. Of course, the photographic layer or a copy thereof as mounted on recording disk 19′ has been developed after recording, and it includes a spiral track defined by contiguous areas of variable transmission and varying degree of opaqueness.

A pinion 33 is also linked to gearbox 31, and it meshes with a rack 34 for driving a scanning or pickup unit 35. This unit 35 includes a housing, receiving a portion of disk 19′ but clearing same. There is furthermore mounted a light source 36 directing a light beam towards a condenser system 37, which focuses this light beam as a scanning spot 38 into the plane of the photographic layer of recording disk 19′. Light spot 38 is being modulated by the spiral track, and the modulated light is observed by a lens 39 directing a modulated light beam into a photoelectric receiver 40. The photoelectric receiver 40 develops an electrical signal representing the recorded video and audio information. This composite signal can then be fed directly to the TV signal input terminal for reproduction in a conventional manner. The occurrence of recorded audio signals during the horizontal sync or blanking periods does not influence proper reproduction of the video signals or formation of synchronization signals in the conventional TV set.

The video-audio reproducing unit described and to be used as an attachment for a conventional TV set furthermore includes an audio-separator unit 41 connected to the output side of photoelectric receiver 40; and the output of separator 41 may be fed either to a separate loud-speaker pertaining to the record player, or it may be hooked up with the TV set and particularly to the input side of the TV audio amplifier or loud-speaker.

The audio-separator unit 41 incorporates features of the present invention and will be described more fully below.

Proceeding now to the description of FIG. 3, there is illustrated a system which can be used for feeding audio signals during selected blanking periods to the recording unit. There is first shown a microphone 51 feeding an output signal to an audio transformer 52 connected to terminals 53 and **54*a*. There is next provided a delay line 54, which may be described hereafter as a long delay line. Delay line 54 is effectively connected to input terminals 53 and 54*a*. The capacitive side of delay line 54 furthermore connects to the output terminal of a monostable flip-flop or monovibrator 55 having a characteristic timing period of 2.5 microseconds. That is to say, delay line 54 is being gated-open for periods of time determined by the monovibrator 55** and for a duration of 2.5 microseconds.

Monovibrator 55 is triggered from a source of horizontal blanking pulses 56 and pertaining to the generator unit 25 outlined above with reference to FIG. 1. The delay line 54 has four output taps 54*a*, 54*b*, 54*c*, and 54*d*. Output terminal 54*a* is being considered as part of the delay unit only for purposes of convenience. Actually, any signal developed at tap 54*a* will not be delayed at all.

Any signal applied to terminals 53 can be drawn from terminal 54*b* after a delay of precisely 63.5 microseconds, which is the time period corresponding to the line frequency and the rate of sync- and blanking-pulse occurrences. Tap 54*c* receives the same signal after a delay of 127 microseconds; and tap 54*d*, which constitutes the end of the long delay line, receives an output signal after 190.5 microseconds.

Taps 54*a*, 54*b*, 54*c*, and 54*d* are respectively connected through diodes 57 to input terminals or taps 58*a*, 58*b*, 58*c*, and 58*d*, respectively, of a second delay line, which shall hereafter also be called a short delay line. This short delay line 58 has an output terminal 59, and it is designed to operate as follows.

Any signal fed into the short delay line at tap or terminal 58*a* will be delayed by 7.5 microseconds; any signal fed to tap or input terminal 58*b* will be delayed by 5 microseconds; any signal fed to tap or terminal 58*c* will be delayed by 2.5 microseconds; and any signal fed to tap or terminal 58*d* will not be delayed at all.

The diodes 57 are normally biased to cut off. A biasing network 61, such as a two-input "AND" gate, is connected thereto so that during selected periods the diodes are being rendered conductive to transmit any signals from tops or terminals 54*a*, 54*b*, 54*c*, and 54*d* to taps or terminals 58*a*, 58*b*, 58*c*, and 58*d*, respectively. The periods for such transfer are being determined by the following network.

A ring counter 60 receives counting pulses from blanketing-pulse source 56. Counter 60 has four stages, so that an output signal can be drawn from counter 60 after every fourth blanking period. This counter output pulse is fed to the bias control source or network 61 of conventional design and having also a control terminal connected to the sync generator, so that, in fact, at the output circuit 62 of biasing source 61 there appears a biasing voltage once every fourth blanking period and for the duration of such a blanking period only. The voltage block of such a nature is being fed to the diodes 57, rendering them conductive for a corresponding period of time.

Figure 4:
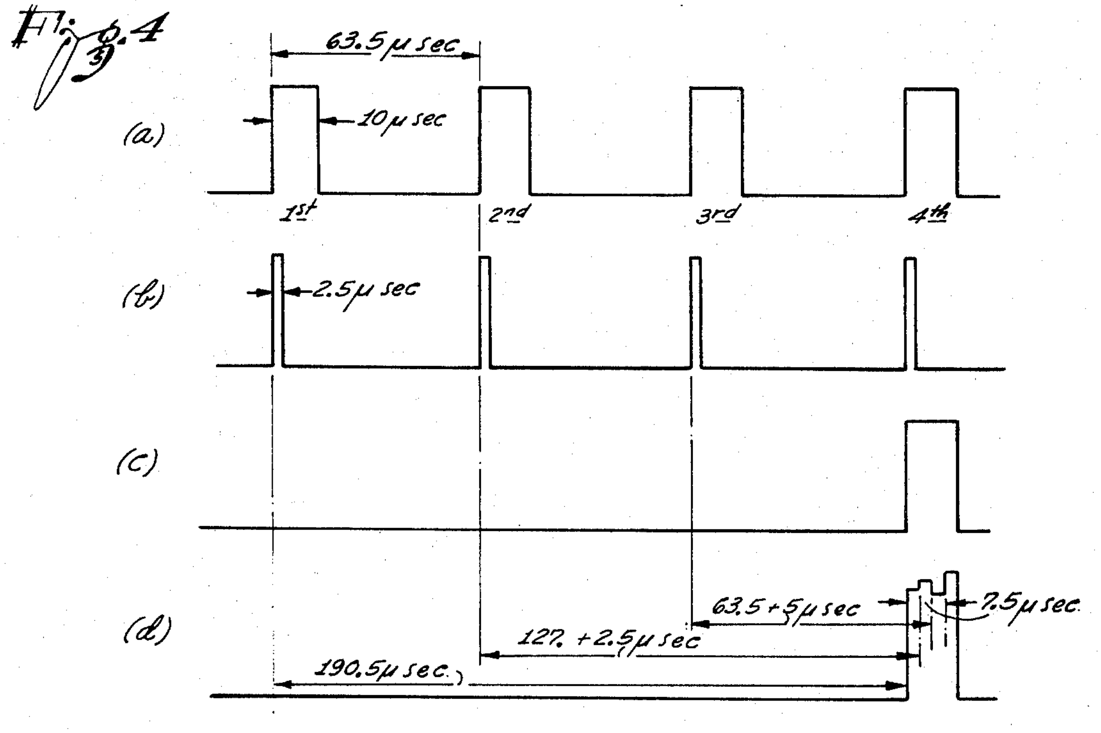

The operation of the network described thus far will be understood best with reference to FIG. 4. FIG. 4*a* illustrates the time sequence of the blanking pulses drawn from source 56. These blanking pulses have a duration of approximately 10 microseconds, and they recur at a rate corresponding to the line frequency, which conventionally is 15,750 cycles per second, so that the leading edges of succeeding blanking pulses or periods are spaced apart by 63.5 microseconds.

FIG. 4*b* illustrates the output pulses developed by monovibrator 55. These output pulses constitute control pulses having a duration of about 2.5 microseconds, and they recur at the same rate as the blanking pulses.

It appears, therefore, that at the rate of the blanking pulses and for a duration of the monovibrator output pulses, audio signals are permitted to enter the long delay line 54 for the formation of audio signal pulses.

The four blanking pulses illustrated in FIG. 4*a* are also being fed to counter 60; and after the fourth blanking pulse, a biasing voltage block is being developed in line 62, as illustrated in FIG. 4*c*. Upon occurrence of the leading edge of this biasing pulse, all diodes 57 are being gated-open for transmission, and the following transmission of signals transpires.

In view of the dimensioning of long delay line 54, the first audio signal pulse will just reach tap 54*d* when diodes 57 are rendered conductive because this first audio pulse is being delayed by 190.5 microseconds, and the biasing pulse at line 62 has a leading edge appearing precisely 190.5 microseconds after the leading edge of the first blanking pulse and after the first audio signal pulse presently considered.

Concurrently thereto, the second audio signal pulse begins to arrive at tap 54*c*; the third audio signal pulse arrives at tap 54*b*; and the fourth audio signal pulse is just being developed at tap 54*a*. Accordingly, and for the time of transmission through diodes 57, the first audio signal pulse passes to terminal 58*d* and appears directly at the output terminal 59. This first audio signal pulse is being fed directly to the recording unit. The first audio signal pulse has, of course, a duration of 2.5 microseconds.

The second audio signal pulse is transmitted without delay from tap 54*c* to input terminal 58*c*, and it is being delayed by short delay line 58 for a period of approximately 2.5 microseconds. Thus, the leading edge of the second audio signal pulse will arrive at terminal 59 at just about the time of the passage of the trailing edge of the first audio signal pulse.

Still at the time of the gating-open of diodes 57, the third auto signal pulse is being passed from tap 54*b* to input terminal 58*b*. The leading edge of this third audio signal pulse will arrive at terminal 58*c* after 2.5 microseconds, which is just about the time the trailing edge of the second audio signal pulse leaves terminal 58*c*, so that the third audio signal pulse arrives at terminal 59 right after the second audio signal pulse.

It will be appreciated that the fourth audio signal pulse is being delayed by an additional 2.5 microseconds, and it will arrive at terminal 59 immediately after the decay of the third audio signal pulse.

Accordingly, and for the duration of the fourth blanking pulse, there will be appear one after another four differently delayed audio signal pulses for the formation of a composite pulse to be recorded.

FIG. 4*d* illustrates the formation of this composite pulse, and it shows the different time periods of delay for the four components forming this composite pulse.

From this description of the pulse diagram as well as the network shown in FIG. 3, there emerges the following general rule: The audio was to be recorded only once during every fourth blanking period, but audio signal pulses were being formed during a limited period of time at the beginning of each blanking period. The first audio signal pulse was delayed by three times the period corresponding to the line frequency (3×63.5 microseconds); the second audio signal pulse was delayed by two times the period corresponding to the line frequency plus a period corresponding to the duration of one audio signal pulse; the third audio signal pulse was delayed by one line-frequency period plus twice the duration of an audio signal pulse; and the fourth audio signal pulse was delayed by three times its duration.

Hence, if T is the period corresponding to the line frequency, if $t$ is the duration of one audio signal pulse, and if $n$ is the number of audio signal pulses to be recorded during one blanking period, then the audio will be recorded every $n$th blanking period. The delaying network, therefore, has to be designed so that the $k$th pulse is delayed by a period of time equal to $$(n-k)\cdot T+(k-1)\cdot t.$$

In order to achieve the inventive objective, it is only necessary that $n$ should not be 3, 5, or 7, or a product of any two of these numbers. If this rule is observed, then it is assured that, on the spiral record of any two neighboring track portions containing recorded blanking pulses, both do not contain audio recordings.

In the example of the invention described with reference to FIG. 3, $n=4$ was selected. FIG. 5 illustrates symbolically the relative position of blanking-pulse recordings with and without audio recordings in neighboring track portions. The outermost track portion, as shown in FIG. 5, contains the second, third, and fourth blanking pulse for one particular frame of recorded video information, but only the fourth blanking period contains a composite audio recording, with audio signals being picked up during the first, second, third, and fourth blanking periods. The second track portion shows a 527th blanking pulse, which actually is the second blanking pulse of the second frame. There are also shown the 528th and the 529th blanking pulses; but only the 528th blanking pulse has an audio recording. The third track shows the 1,052nd blanking pulse with the recorded audio information, and the 1,053rd and the 1,054th blanking pulses do not contain any audio information. The fourth track portion, as illustrated, has three blanking-pulse recordings, but none of them contains an audio recording.

It, therefore, appears that if a scanning spot, by virtue of its extension, runs simultaneously over four track portions, no cross talk will result from such a pickup because only one out of four radially aligned blanking-pulse recordings does also contain an audio recording. Such an extended scanning spot is indicated by the contour line 38. It should be mentioned that the tracks, as illustrated in FIG. 5, are not shown in true dimensions, but the true width of each track is considerably smaller than illustrated in relation to the distance between succeeding blanking pulses or the angular length of any blanking pulse. For this reason, the normally circular scanning spot 38 is being shown radially distorted.

Proceeding now to the description of FIG. 6, there is shown a modification of the audio signal-pulse transfer and delaying system. The system, shown in FIG. 6, requires slightly more circuit elements, but it permits individual adjustment of each of the required delaying periods. There is first shown again the source 56 of blanking pulses, feeding its output pulses to a four-stage ring counter 70. The output side of each of the four stages of ring counter 70 connects to one gating terminal each of gates 71, 72, 73, and 74, respectively. A second gating terminal of each of these four gates connects to the output terminal of the monovibrator 55, furnishing control pulses of a duration of 2.5 microseconds at the rate of blanking-pulse occurrences as aforedescribed. It appears, therefore, that these gates 71, 72, 73, and 74 are cyclically gated-open, one at a time and at the rate of the blanking-pulse frequency. The audio signals are continuously fed to the signal input terminals of all four gates, but they are permitted to pass only through the respectively open gate and for a duration of 2.5 microseconds.

The signal output terminal of gate 71 connects to a delay line 75, delaying its input for 190.5 microseconds. The signal output terminal of gate 72 is connected to a delay line 76, delaying its input pulse when coming through gate 72 by 129.5 microseconds. The signal output terminal of gate 73 is connected to a delay line 77, which delays its respective input pulse by 68.5 microseconds. Finally, the gate 74 has its signal output terminal connected to a delay line 78, delaying its respective input pulse by 7.5 microseconds.

The output terminals of delay lines 75, 76, 77, and 78 are connected to a mixing amplifier or signal-adding network 79 for the formation of a composite audio-recording signal of the nature described with reference to FIG. 4*d*.

Proceeding now to the description of FIG. 7, there is shown in detail a network to be employed as audio-separator 41 shown in FIG. 2. This audio-separator 41 preferably includes a delaying network of the type shown in FIG. 3, the only distinction being that the direction of signal transmission and transfer is opposite to the one described above with reference to FIG. 3.

In FIG. 7, there is shown as a block the video-audio pickup or detector unit 35 cooperating with the recording disk 19′, as was outlined with reference to FIG. 2. The output signal of detector 35 is fed to the video receiver, but through an envelope detector 80 it is also fed to the signal input terminal of a gate 81. Envelope detector 80 eliminates the RF frequency from the signals. The composite video-and-audio signal is also fed to a clipper 82, separating the blanking pulse from the composite signal and feeding a respective output pulse to a ring counter 83. Counter 83 corresponds to counter 60; that is to say, it has four stages and produces an output pulse once every four blanking periods. This counter output pulse is fed to the gating terminal of gate 81 so that gate 81 is being gated-open whenever a blanking pulse contains a composite audio recording. The signal output terminal of gate 81 connects to a terminal 59′, which in this figure is the input terminal of a delaying network. There is again provided a short delay line 58′ with four taps **68*a*′, 58*b*′, 58*c*′, and 58*d*′. There are diodes 57′ connecting the taps of the short delay line to taps 54*a*′, 54*b*′, 54*c*′, and 54*d*′ respectively, pertaining to a long delay line 54′ as input terminals thereof. Output terminal 53′ of the delaying network is connected to the signal input terminal of a gate 84, having its gating terminal connected to the output side of clipper 82**.

It appears that, once every four blanking periods, there will arrive at terminal 59′ a composite audio signal of the type shown in FIG. 4*d*. This pulse will be fed into the short delay line 58′. The arrival of the leading edge of this composite pulse at terminal **58*a*′, which occurs 7.5 microseconds after the arrival of such a pulse at terminal 59′, is being used to trigger a biasing source 85 for gating-open or rendering conductive all of the diodes 57′, so that during the next 2.5 microseconds the short delay line is being emptied, and the composite audio pulse is being split up into four components, respectively, arriving at taps 54*a*′ through 54*d*′ during the next 2.5 microseconds. At the end of that period, the transmission is terminated, and the individual audio signal pulses are being delayed by the various sections of the long delay line to appear at a rate corresponding to the blanking-pulse frequency. It should be mentioned that gate 84 may be dispensed with, because the passage of the audio signal pulses from long delay line 54′ into an audio demodulator 86 in the audio amplifier 87** does not have to be phase-locked to the blanking-pulse occurrences.

It will be appreciated that for play back the network shown in FIG. 6 can also be used in a similar manner and with similar reversion of the direction of audio signal-pulse passage.

In the foregoing examples and embodiments, a composite pulse was either recorded or reproduced, having four audio signal pulses as components. This constitutes the preferred form of practicing the invention, but the formation of a composite pulse is not limited to four components. With any number of components, one can attain the principal object of the invention, provided that the number of components or audio signal pulses combined in one composite pulse is not 3, 5, or 7, or a product of any two of these digits.

The invention is not limited to the embodiments described above, but all changes and modifications thereof not constituting departures from the spirit and scope of the invention are intended to be covered by the following claims.

What is claimed is:

1. Apparatus for recording audio signal information on the same track on which video information is being recorded, with video and audio signals being recorded in respectively allotted, contiguously succeeding track portions, the combination comprising:

a source of control pulses produced at the rate of horizontal video blanking pulses; a source of audio signals; terminal means;
gating means interconnecting said source of audio signals and said terminal means and having its gating terminal connected to said source of control pulses for gating and sampling of audio signal pulses during each blanking pulse period;
means connected to said terminal means for differently delaying a plurality of succeeding audio signal pulses each delay being an integral multiple of the period in between sequential blanking pulse periods;
means connected to said delaying means for forming a composite pulse of instantly succeeding audio signal pulses, of the differently delayed audio signal pulses, said composite pulse having a duration not exceeding that of a video blanking period; and
means for recording said composite pulse in a track portion allotted to record horizontal blanking pulses.

2. Apparatus for recording audio signal information on the same track on which video information is being recorded, with video and audio signals being recorded in respectively allotted, contiguously succeeding track portions, the combination comprising:
a source of control pulses produced at the rate of the video horizontal sync pulses but of shorter duration;
a source of audio signals;
a first delay line having a plurality of taps and an input terminal;
means for applying the audio signals from said source to said input terminal for the duration of said control pulses;
a second delay line having a plurality of input terminals respectively connected to said taps, but normally being decoupled therefrom, and having a common output terminal;
means for effectively coupling said first delay line to said second delay line after a predetermined number of control pulses; and
record-forming means connected to said output terminal and being controlled by the signal developed at said output terminal.

3. Apparatus as set forth in claim 2, said coupling means including a plurality of diodes, and means for variably biasing said diodes.

4. Apparatus for recording audio signal information on the same track on which video information is being recorded, with video and audio signals being recorded in respectively allotted, contiguously succeeding track portions, the combination comprising:
a source of control pulses produced at the rate of horizontal video blanking pulses corresponding to a recurrence rate of period T, said control pulses having a duration $t$;
a source of audio signals; terminal means; means for applying said audio signals to said terminal means during occurrence and for the duration $t$ of each of $n$ of said control pulses, thereby forming $n$ distinct audio signal pulses;
a network connected to said terminal means for delaying the $k$th audio signal pulse for a period of time equal to $(n-k)\cdot T+(k-1)\cdot t$, with $n$ being an integer selected by the rule $n\cdot t$ not to exceed the duration of a video blanking pulse, and with $k$ being any integer from 1 to $n$; and
means for recording said delayed audio signal pulse in a track portion allotted to record horizontal blanking pulses.

5. An audio signal transmission system, the combination comprising:
a first delay line having terminal means and a plurality of taps spaced apart corresponding to time delays equal to the line-frequency period;
a second delay line having terminal means and a plurality of taps spaced apart corresponding to the duration of audio signal pulses;
a plurality of transmission channels respectively interconnecting the taps of said first and said second delay lines;
means for concurrently activating said transmission channels for transfer of signals from one of said two delay lines to the respective other one;
means for selectively connecting the terminal means of said first delay line to a recording-producing and a recording-reproducing unit; and
means for selectively connecting the terminal means of said second delay line to a source of audio signals and a loud-speaker.

6. An audio signal transmission system for transmitting a train of audio signal pulses and for selective connection between a source of audio signals and a recording unit, and between a loud-speaker and a recording-reproducing unit, the combination comprising:
a first delay means having a plurality of taps spaced apart in correspondence to the duration of the period of the audio signal-pulse frequency;
a second delay means having a plurality of taps spaced apart in correspondence to the duration of such audio signal pulses; and
a plurality of transmission channels temporarily connecting the taps of said first delay means to the taps of said second delay means, respectively, and at a frequency which is an integral fraction of the pulse-train frequency, with the denominator of such a fraction being a number equal to said plurality.

7. An audio signal transmission system for transmitting a train of audio signal pulses and for selective connection between a source of audio signals and a recording unit, and between a loud-speaker and a recording-reproducing unit, the combination comprising:
first means for delaying a first audio signal pulse by a period of time equal to $(n-1)\cdot T$; and
second means for delaying a second audio signal pulse by a period of time equal to $(n-2)\cdot T+t$, with $n$ being an integer, T being the period of time between said first and said second audio signal pulse, and $t$ being the duration of said first audio signal pulse.

8. An audio signal transmission system for transmitting a train of audio signal pulses and for selective connection between a source of audio signals and a recording unit, and between a loud-speaker and a recording-reproducing unit, the combination comprising:
a first delay means having a plurality of $n$ taps spaced apart in correspondence to the period of the TV horizontal line frequency;
a second delay means having a plurality of $n$ taps spaced apart in correspondance to the duration of audio signal pulses; and
a plurality of $n$ transmission channels temporarily connecting the taps of said first delay means to the taps of said second delay means, respectively, and at a frequency which is $1/n$ of the pulse-train frequency.

9. A system for recording information, the combination comprising:
a recording disk;
means for inscribing a spiral recording track on said disk;
means for feeding video signals to said inscribing means; and
means for feeding audio signals for recording to said inscribing means during selected blanking-pulse periods to the exclusion of at least every other blanking pulse period.

10. A system for recording information on a disk, the combination comprising:
means for inscribing a spiral recording track on said disk;
means for feeding video signals to said inscribing means; and
means for feeding audio signals for recording to said inscribing means during selected blanking-pulse periods to the exclusion of at least every other blanking pulse.

11. A system for reproducing audio information stored on a disk along a spiral track thereon, comprising:

detector means for scanning said spiral track;

means connected to said detector means and being responsive to selected blanking-pulse periods as recorded in said track and to the exclusion of at least every other blanking pulse period; and means connected to said detector means and to said blanking-pulse responsive means to monitor audio recordings during said selected blanking-pulse periods only.

References Cited

UNITED STATES PATENTS

| | | | |
|---|---|---|---|
| 2,350,902 | 6/1944 | Kallmann | 178—5.6 |
| 2,671,130 | 3/1954 | Weighton | 178—5.6 |
| 3,157,739 | 11/1964 | Okamura | 178—6.6 |

ROBERT L. GRIFFIN, *Primary Examiner.*

JOHN W. CALDWELL, *Examiner.*

J. T. STRATMAN, *Assistant Examiner.*